United States Patent
McGhie et al.

[11] 4,019,305
[45] Apr. 26, 1977

[54] METHODS AND APPARATUS FOR FOLDABLY CLOSING THE ENDS OF LAMINATED METAL-PLASTIC TUBES

[75] Inventors: Russell P. McGhie, Somers; Olaf Bredholt, Brooklyn, both of N.Y.; Winston G. Rockefeller, Woodcliff Lake, N.J.

[73] Assignee: Colgate-Palmolive Company, New York, N.Y.

[22] Filed: Dec. 9, 1975

[21] Appl. No.: 639,124

Related U.S. Application Data

[63] Continuation of Ser. No. 557,059, March 10, 1975, abandoned, which is a continuation of Ser. No. 379,911, July 16, 1973, abandoned.

[52] U.S. Cl. .................................. 53/39; 53/46; 53/373
[51] Int. Cl.² .................. B65B 7/14; B65B 7/08; B65B 51/14
[58] Field of Search ............... 53/39, 46, 373, 371, 53/370

[56] References Cited

UNITED STATES PATENTS

| 1,975,996 | 10/1934 | Westin | 53/371 X |
| 2,077,653 | 4/1937 | Westin | 53/373 X |
| 2,381,716 | 8/1945 | Booth | 53/371 X |
| 2,389,506 | 11/1945 | Hallead et al. | 53/371 X |
| 3,137,111 | 6/1964 | Bostrom | 53/373 |

Primary Examiner—Othell M. Simpson
Assistant Examiner—Horace M. Culver
Attorney, Agent, or Firm—Strauch, Nolan, Neale, Nies & Kurz

[57] ABSTRACT

Toothpaste or like tubes having flexible metal-plastic laminate walls have one end flattened and folded in metal pressure jaw assemblies controllably heated in the range of 250° to 350° – 400° F.

2 Claims, 16 Drawing Figures

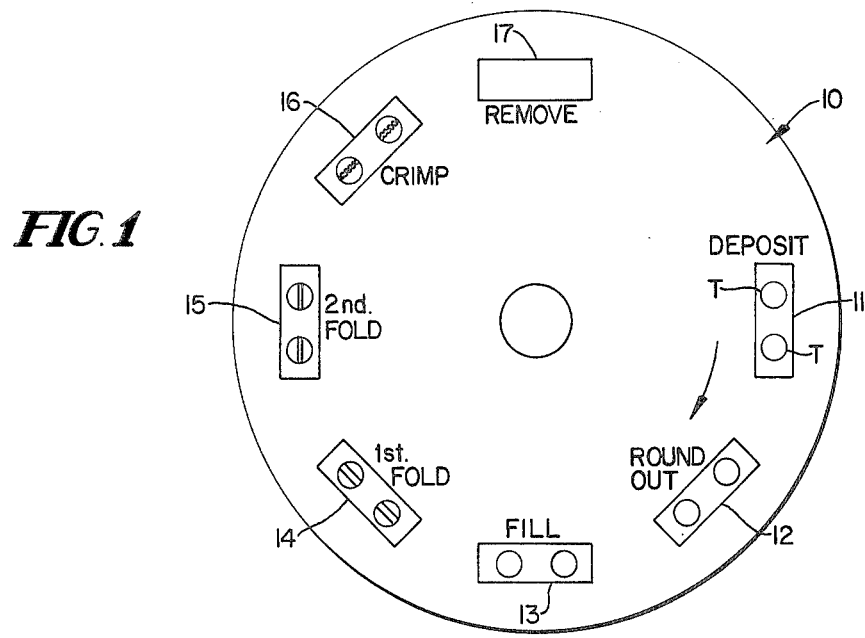
FIG. 1
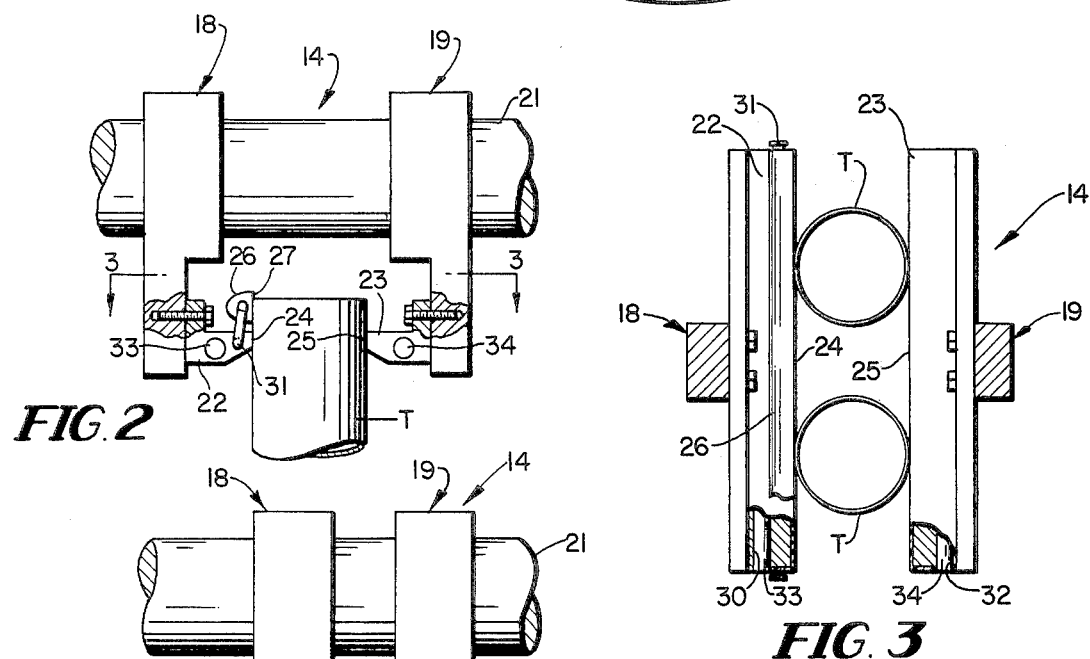
FIG. 2
FIG. 3
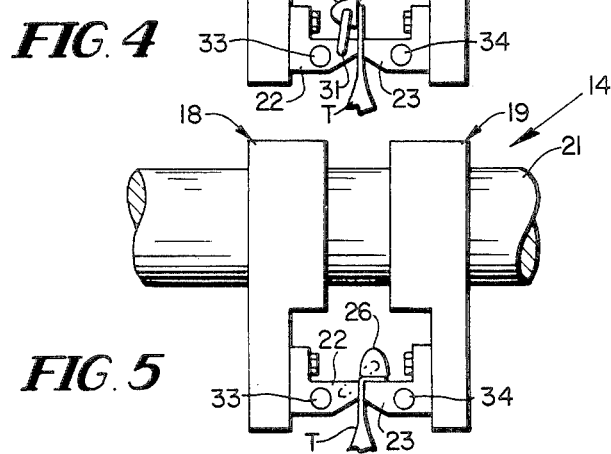
FIG. 4
FIG. 5
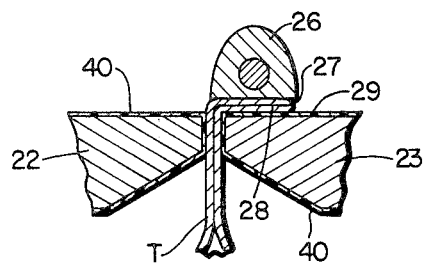
FIG. 5A

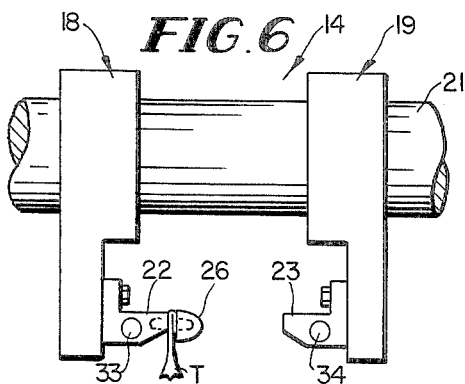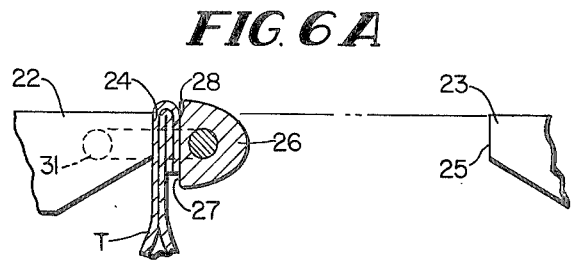

METHODS AND APPARATUS FOR FOLDABLY CLOSING THE ENDS OF LAMINATED METAL-PLASTIC TUBES

This is a continutation of Ser. No. 557,059 filed Mar. 10, 1975 which in turn is a continuation of Ser. No. 379,911 filed July 16, 1973 and now abandoned.

This invention relates to methods and apparatus for reliably and and speedily closing the ends of filled flexible walled containers such as toothpaste tubes, and is particularly concerned with such methods and apparatus for closing the ends of tubes of this type having laminated metal-synthetic plastic walls.

The closing or filled toothpaste and like flexible walled tubes is necessarily carried out today at high speed in automatic machinery. For example, in a widely used type of machine, empty metal body tubes having dispensing nozzles and closure caps secured at one end are placed in inverted vertical position with the open end up in sockets on a turntable or like conveyor which is indexed step by step through product filling and tube body end closing stations. In these machines, the tube body end closing is effected mechanically by coating reciprocable jaw and movable bending arm arrangements that, after the tube is filled, flatten the open tube body end and bend it through 180° in a first indexed station to provide a folded end section, then bend the folded end section through 180° at a second indexed station to provide a double folded end section, and then crimp the double folded end section by clamping it under pressure between reciprocable corrugated jaws to more tightly compress and interlock the tube walls therein.

Machines of the foregoing type are in successful commercial operation, one embodiment which is adapted to fill and then fold side by side tube body ends at the same time having a production rate of 150 competed tubes per minute for example.

More recently there has been a tendency to package toothpastes in tubes having laminated metal-plastic body walls. One reason is that certain ingredients cannot be efficiently packaged in metal tubes and require inert plastic layers to either protect the metal or prevent migration of the product through the metal. Integral synthetic plastic tubes have been proposed, but have not met with general acceptance. The use of laminated metal-plastic tubes on the other hand has increased, probably due to some feeling that at least one layer of metal should be included for physical strength and resistance to rupture and to help the tube body retain a squeezed shape during dispensing.

It as been proposed as disclosed in U.S. Pat. No. 3,632,943, to provide a special sealing jaw equipped with a high frequency heating device for closing laminated tube ends in automatic machines. This apparatus is not concerned with folding and requires replacement of existing apparatus and the provision of relatively expensive heating and cooling equipment.

The adaptation of laminated metal-plastic tubes to conventional automatic machinery of the type that fold over the tube ends raises special problems because folded over sections of the laminated tube walls do not retain a dead fold condition, as did the metal walled tubes, but tend to unfold unpredictably and uncontrollably.

The invention has as its major advantage the provision or relatively non-complex and inexpensive automatic methods and apparatus for mechanically foldably closing the ends of toothpaste and like tubes having laminated metal-plastic body walls.

Another advantage of the invention is to provide novel methods and apparatus for foldably closing the ends of laminated metal-plastic wall tube bodies involving the application of controlled heat at the fold regions whereby the applied heat is maintained at a desired temperature within a predetermined temperature range that will enable dead folds to be made while preventing damage to the plastic.

A further advantage of the invention is to provide a novel tube body end folding apparatus, particularly for laminated-metal-plastic wall tubes, wherein jaws applying pressure at the fold region are heated at least on the surfaces that contact the tube body within a predetermined temperature range that is considerably above ambient temperatures and at a controlled temperature which will be high enough to insure a dead fold but not be high enough that the plastic is unduly softened and thereby melted or marred by the fold jaws. More specific to ths advantage, where the synthetic plastic is polypropylene for example, the jaw surfaces are heated within a range wherein the lower limit is about 250° F and the upper limit is about 300° to 400° F or possibly more depending on the speed of production and the time the jaws remain in contact with the tube surfaces.

Another advantage of the invention is to provide in a tube body end folding apparatus heated metal pressure applying jaws that are coated at least at the tube contacting surfaces with a material to which the plastic of the tube body wall will not stick. A more specific aspect of this advantage is to provide heated pressure applying jaws coated with polytetrafluoroethylene.

An important advantage of the invention is that it enables automatic tube end closing machines now used for closing metal tube ends to be relatively inexpensively and readily adapted for a closing laminated metal-plastic tubes with substantially no mechanical aleration.

Further advantages of the invention will appear as the description proceeds in connection with the annexed claims and the appended drawings.

BRIEF DESCRIPTION OF DRAWINGS

FIG. 1 is a diagrammatic top plan view showing a turret wherein operational stations according to a preferred embodiment of the invention are indicated;

FIG. 2 is a fragmentary view in elevation partly broken away and in section showing one form of tube end closing mechanism at the first fold station in the condition it occupies when the filled tube enters that station;

FIG. 3 is a top plan view partly in section substantially on line 3—3 of FIG. 2;

FIG. 4 is a fragmentary view in elevation showing the mechanism of FIG. 2 after the tube end has been flattened;

FIG. 5 is a fragmentary view in elevation showing the mechanism of FIG. 2 after part of the first fold has been made;

FIG. 5A is an enlarged fragmentary elevation in section showing the partial folding of FIG. 5;

FIG. 6 is a fragmentary view in elevation showing the mechanism of FIG. 2 upon completion of the first fold;

FIG. 6A is an enlarged fragmentary elevation in section showing the completed first fold;

FIG. 7 is a fragmentary view in elevation showing a form of the mechanism at the second fold station after entry of the tube end having the first fold;

FIG. 7A is an enlarged fragmentary elevation in section illustrating detail of FIG. 7;

FIG. 8 is a fragmentary view in elevation showing the mechanism of FIG. 7 after completion of a partial second fold on the tube end;

FIG. 8A is an enlarged fragmentary detail partly in section of part of FIG. 8;

FIG. 9 is a fragmentary view in elevation showing the mechanism of FIG. 7 upon completion of the second fold;

FIG. 9A is an enlarged fragmentary elevation showing detail of FIG. 9;

FIG. 10 is a diagrammatic view showing a crimping station; and

FIG. 11 is a schematic view of the power, temperature sensing and control circuit for the heating units in the fold jaws.

PREFERRED EMBODIMENTS

In the invention as the preferred embodiment, end closing of flexible walled tubes wherein the body wall is a plastic-metal-plastic laminate will be described. More specifically the metal may be aluminum foil about 2–3 mils thick, the inner layer of polypropylene about 2 mils thick and the outer layer of polypropylene about 3 mils thick.

FIG. 1 shows diagrammatically a vertical axis turret 10 of an existing type commercial machine wherein pairs of empty metal tubes are mounted on the turret with their open ends facing upwardly at a deposit station 11, after which the turret is successively intermittently rotated to index the tube pairs respectively at a station 12 wherein the tubes are made accurately cylindrical, a filling station 13 wherein toothpaste is introduced, a first fold station 14, a second fold station 15, a fold crimping station 16 and eventually to a station 17 where the filled closed tubes are removed from the turret.

As will appear the invention is mainly concerned with modification of the fold stations 14 and 15, whereby controlled heat is applied to the folding mechanism, and otherwise the turret may be conventional.

The tubes are acted upon in pairs in the disclosed machine for doubling production, and the same principle could be applied to closing only one or more than two side by side tubes.

Referring to FIGS. 2 and 3, upon entering station 14 the pair of filled tubes T enter the space between open jaw assemblies 18 and 19 that are relatively slidably mounted for reciprocable movment toward and from each other on a slide support rod 21 that is fixed on the machine frame. At this time in the operational cycle the jaw assemblies 18 and 19 are in maximum open position. The jaw assemblies comprise elongated laterally aligned similar metal jaw elements 22 and 23 that project toward each other and have opposed flat faces 24 and 25 respectively that are parallel and vertical and spaced apart a small amount greater than the diameter of the tubes therebetween.

As indicated in FIG. 2, the tubes T are so supported from below that the upper portion of each projects a short distance above the level of jaws 22 and 23. As soon as indexing rotation of the turret stops, jaw assemblies 18 and 19 are relatively slidably moved to tightly close on the tubes and flatten the tube ends between jaw faces 24 and 25, this condition being shown in FIG. 4. While the flattened tube ends are held tightly gripped between jaw faces 24 and 25, a rockable bar 26 mounted on jaw assembly 18 to extend longitudinally along the upper part of jaw 22 and having a flat face 27 that is vertical in the open jaw condition of FIG. 2 is rocked through 90° to correspondingly fold over the flattened tube upper end portions indicated at 28 in FIG. 5A upon the upper flat surface 29 of jaw 23. In this machine the bar 26 is pivoted at opposite ends at 31 upon an axis that is fixed relative to jaw face 24.

While bar 26 remains in its FIG. 5A position the jaw assemblies 18 and 19 are now separated back to their initial open position with the partly folded tube ends remaining in contact with jaw 22, and bar 26 is now rocked to a 180° displaced position of face 27 whereby (FIGS. 6 and 6A) the first fold of the flattened tube end portion is completed. The jaw 26 is then rocked back to its FIG. 2 position, whereby all of the mechanism at station 14 is now back at its FIG. 2 condition, and the operation at station 14 is completed.

The pair of tubes having their flattened ends formed with the first fold are now moved, by indexing the turret, to station 15. FIGS. 7–9 illustrate the second fold operation.

As indicated in FIG. 7, the tubes having the first end fold 28 enter the second fold station between jaw assemblies 118 and 119 tht are sufficiently open only long enough to introduce the tubes between parallel opposed flat jaw surfaces 124 and 125. Structurally, as indicted the jaw assemblies 118 and 119 may be the same as jaw assemblies 18 and 19 of the first fold station, and parallel jaw elements 122 and 123 thereon may be the same as jaw elements 22 and 23 of the first fold station. Similarly, rockable bar 126 having a flat tube engaging face 127 is pivoted on jaw 122 in the same manner that bar 26 is mounted on jaw 22.

The jaw assemblies 118 and 119 are first relatively moved together to tightly clamp the flattened tube end between them, essentially as shown in FIG. 7A. Now bar 126 is rocked through 90° (FIGS. 8 and 8A) to partially accomplish the second fold whereby a dual fold indicated at 128 is partly formed on the tube.

Now the jaw assemblies 118 and 119 are relatively slidably separated on support rod 121, the separation being shown exaggeratedly in FIG. 9, with the folded end of the tube remaining in contact with jaw 122, and then bar 126 is rocked through the remainder of its 180° movement to the position shown in FIGS. 9 and 9A whereby the second fold 128 is completed. As shown in FIG. 9A the dual fold 128 is tightly clamped between jaw surface 124 and bar surface 127 at the end of this operation. Then bar 126 is rocked back to its FIG. 7 position, and station 15 reassumes its FIG. 7 condition awaiting entry of the next first folded tube or tubes.

Finally the tubes with the dual end fold 128 are indexed to station 16 where serrated crimping jaws 140 and 141 clamp upon them to crimp the fold sections into final tight interlock, and then the turret is indexed to convey the completed tubes to a removal statior as at 17. A crimping station of the type usable at station 16 herein is disclosed in U.S. Pat. No. 3,273,310 issued Sept. 20, 1966.

Essentially all of the foregoing structure and mode of operation is present in existing machines currently filling and end folding metal walled tubes. The end folds obtained thereby in metal folds are reliably dead folds. The details of mechanism controlling the sequential turret, jaw and bar movments are not described because they form no part of the present invention. The invention in its preferred embodiment adapts such machines to perform the same operations and achieve dead folds on metal-plastic tubes.

It has been found that when folds such as at 28 and 128 are performed, as in the above described apparatus, on laminated metal-plastic tubes the fold tends to spring back and open out whereby dead fold conditions are not obtainable and the machine sequence cannot be reliably performed.

In the invention it has been discovered that if the foregoing first and second folds are accomplished in the presence of a predetermined temperature, considerably higher than the usual ambient temperature, dead folds can be reliably obtained in the foregoing apparatus.

The drawings show a preferred mode of accomplishing this with a minimum of change of existing apparatus.

Referring to FIGS. 2 and 3, jaws 22 and 23 are rigid highly heat conductive metal elements. In order to heat these jaws to a desired temperature, longitudinal bores 30 and 32 are formed, and electrical heater units 33 and 34 are mounted in those bores. These heater units are preferably located near the tube engaging jaw faces 24 and 25 so that those faces which are in direct heat applying contact with the tube surfaces will be heated to the desired temperature.

A preferred heating and control circuit for the heater units 33 and 34 is schematically shown in FIG. 11. The units are connected through a control assembly 35 to a conventional source of power P. One jaw 22 is provided with a thermocouple or like heat sensor indicated at 36 and connected to control assembly 35. Internally the control assembly is provided with means for metering power supplied to the heater units 33 and 34 according to a predetermined temperature setting made by adjusting an indicator 37 over a temperature calibrated scale 38. Internally the control device may comprise a resistance or potentiometer arrangement having a control element responsive to the sensing signal from the thermocouple to assure such output power that faces 24 and 25 will be heated to the temperature set by indicator 37. Conventional equipment may be used for the purpose. Jaw faces 124 and 125 are similarly controlled to be heated to a predetermined temperature.

The temperature of jaw faces 24, 124 and 25, 125 should be high enough to so inhibit the tendency of the plastic layer or layers to open the folded tube end and thereby provide a dead fold at both the first and second fold stations, but should not be so high as to undesirably melt or mar the plastic. Where the plastic is polypropylene as above noted, the temperature of jaw faces 24, 124 and 25, 125 is advantageously in the neighborhood of 300° F and preferably in the range between 250° and 300° F. The particular temperature set by indicator 37 as a practical matter may be determined mainly by the speed of the folding operations, that is the length of time the heated jaw faces remain in contact with the tube surfaces, and it has been determined that the available temperature range, with the preferential temperatures being determined by the speeds of operation, is between 250° F as a lower limit and about 350° F to 400° F as the upper limit. Below 250° F a suitable dead fold is not obtainable. Above 400° F the plastic is undesirably softened.

It is our theory that the applied heat in the foregoing ranges is effective to destroy the inherent memory characteristic of the plastic layer or layers that tend to open the given fold.

In order to insure against sticking of the heat softened plastic to the metal jaws, it is preferable to coat each jaw at least in all areas subject to contact with the tube surfaces with a smooth layer of an inert plastic having a very high melting point, such an inert plastic being the polytetrafluoroethylene indicated at 40 in FIG. 5A and 140 in FIG. 8A.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of foldably closing the end of a flexible dispensing tube having a metal-plastic laminate wall comprising a layer of a metal that will retain a dead fold shape and a coextensive external bonded layer of a heat softenable synthetic plastic on at least one side of said metal layer, said plastic being of a material which has an inherent memory characteristic tending during cooling to open a fold imparted thereto when heated, comprising flattening and folding an end section of the laminated tube wall while subjecting said section to controlled heat for a predetermined period and at a predetermined temperature appreciably above ambient temperature and within a range the lower limit of which is such that the plastic is softened and conditioned to permit a dead fold in the metal layer to be accomplished and said applied heat being such as to destroy said memory whereby a dead fold at the tube end is maintained by the folded metal layer even when said end section cools to ambient temperature, and the upper limit of which is such that the plastic is not undesirably softened or damaged.

2. The method defined in claim 1, wherein said metal is aluminum or an aluminum alloy, the plastic of said metal-plastic laminate is polypropylene, and said predetermined temperature is in the range of 250° and 350° – 400° F.

* * * * *

UNITED STATES PATENT OFFICE
CERTIFICATE OF CORRECTION

Patent No. 4,019,305            Dated April 26, 1977

Inventor(s) Russell P. McGhie et al.

It is certified that error appears in the above-identified patent and that said Letters Patent are hereby corrected as shown below:

Column 1, line 24 change "coating" to --coacting--.

Column 1, line 52 change "as" to --has--.

Column 1, line 67 change "or" to --of--.

Column 2, line 21 change "ths" to --this--.

Column 2, lines 38 and 39 change "aleration" to --alteration--.

Column 4, line 25 change "tht" to --that--.

Column 4, line 58 change "statior" to --station--.

Column 4, line 59 delete "station".

Signed and Sealed this nineteenth Day of July 1977

[SEAL]

Attest:

RUTH C. MASON
*Attesting Officer*

C. MARSHALL DANN
*Commissioner of Patents and Trademarks*